US007280344B2

(12) United States Patent
Seff et al.

(10) Patent No.: US 7,280,344 B2
(45) Date of Patent: Oct. 9, 2007

(54) CONSOLIDATED CIRCUIT BREAKER SUPPORT INSULATOR AND BUS ALIGNMENT PIECE

(75) Inventors: Paul D. Seff, Lincoln, IL (US); Michael J. Ranta, Bloomington, IL (US)

(73) Assignee: Eaton Corporation, Cleveland, OH (US)

( * ) Notice: Subject to any disclaimer, the term of this patent is extended or adjusted under 35 U.S.C. 154(b) by 364 days.

(21) Appl. No.: 11/105,192

(22) Filed: Apr. 13, 2005

(65) Prior Publication Data

US 2006/0232913 A1 Oct. 19, 2006

(51) Int. Cl.
*H02B 1/04* (2006.01)
*H02B 1/044* (2006.01)
*H02B 1/32* (2006.01)

(52) U.S. Cl. ...................... 361/652; 361/673; 361/647; 361/648

(58) Field of Classification Search ................ 361/652, 361/653, 654, 655, 656, 657, 658, 673, 649, 361/650

See application file for complete search history.

(56) References Cited

U.S. PATENT DOCUMENTS 3,590,332 A * 6/1971 Anderson et al. ........... 361/650
3,767,977 A * 10/1973 Bachman .................... 361/656
3,842,322 A * 10/1974 Leonard ..................... 361/673
4,001,653 A * 1/1977 Olashaw et al. ............ 361/611
4,159,504 A * 6/1979 Cook ......................... 361/650
4,205,892 A * 6/1980 Clement et al. ............ 439/721
4,472,761 A * 9/1984 Koslosky et al. ........... 361/638
4,698,727 A * 10/1987 Hibbert et al. .............. 361/658
4,713,728 A * 12/1987 Raabe et al. ................ 361/652
5,046,173 A * 9/1991 Wall, Jr. ..................... 361/634
5,150,091 A * 9/1992 Hart et al. .................. 335/202
5,295,042 A * 3/1994 Midgley et al. ............ 361/634
5,515,236 A * 5/1996 Nolan et al. ................ 361/652
5,600,536 A * 2/1997 Newsome et al. .......... 361/648
6,561,844 B1 5/2003 Johnson
2006/0002056 A1* 1/2006 Abrahamsen et al. ....... 361/652

FOREIGN PATENT DOCUMENTS

EP 69045 A2 * 1/1983

* cited by examiner

*Primary Examiner*—Anatoly Vortman
(74) *Attorney, Agent, or Firm*—Martin J. Moran

(57) ABSTRACT

The present invention which provides for a consolidated circuit breaker support insulator and bus alignment piece having a molded body and at least one horizontal bus. Preferably, there are three horizontal buses. Each horizontal bus is structured to extend between, and be in electrical communication with, a socket bus horizontal terminal and a vertical conductor. The molded support includes a non-conductive body has a vertical plate member and a horizontal plate member.

20 Claims, 2 Drawing Sheets

CONSOLIDATED CIRCUIT BREAKER SUPPORT INSULATOR AND BUS ALIGNMENT PIECE

BACKGROUND OF THE INVENTION

1. Field of the Invention

The present invention relates to a circuit breaker support insulator and, more specifically, to a consolidated circuit breaker support insulator and bus alignment piece.

2. Background Information

For certain enclosed circuit breaker configurations, external, socket busing was coupled to vertical busing at a circuit breaker support insulator assembly. The circuit breaker was enclosed in a housing assembly having a sidewall. The external socket busing, typically three buses, extended through an opening in the sidewall and each bus ended in a horizontal terminal. The sidewall opening was covered with a non-conductive bus alignment piece. The bus alignment piece included an opening for each socket bus. Each bus opening on the bus alignment piece was structured to place the bus that extended therethrough in the proper position for coupling with an associated horizontal bus. During installation, the bus alignment piece was coupled to the socket busing by passing the socket buses through the openings prior to positioning the horizontal terminals into the circuit breaker housing. The bus alignment piece was then coupled to the housing assembly by fasteners. Thus, each horizontal terminal was placed in the proper position to be coupled to the horizontal buses.

The horizontal terminals were also supported by a circuit breaker support insulator assembly within the circuit breaker housing assembly. The circuit breaker support insulator assembly included a generally planar, non-conductive member and a number of horizontal buses. The circuit breaker support insulator assembly also included two brackets, a first bracket structured to couple the planar, non-conductive member to the circuit breaker, and a second bracket structured to couple the planar, non-conductive member to the circuit breaker housing assembly. The planar, non-conductive member was coupled to each horizontal terminal by two fasteners. The planar, non-conductive member was typically structured to position two horizontal terminals on an upper side of the planar, non-conductive member and one horizontal terminal on the lower side of the planar, non-conductive member. The horizontal buses were structured to be coupled to the horizontal terminals and extend generally perpendicular thereto. The distal ends of the horizontal buses extended beyond the edge of the planar, non-conductive member and were generally aligned. The distal ends of the horizontal buses were structured to be coupled to the vertical buses. Each horizontal bus was coupled to the horizontal terminal by two fasteners. Thus, the prior art circuit breaker support insulator assembly and bus alignment piece included multiple components and an excessive number of fasteners.

There is, therefore, a need for a consolidated circuit breaker support insulator and bus alignment piece that requires fewer fasteners.

There is a further need for the consolidated circuit breaker support insulator and bus alignment piece to be compatible with prior art circuit breaker housing assemblies and socket buses.

SUMMARY OF THE INVENTION

These needs, and others, are met by the present invention which provides for a consolidated circuit breaker support insulator and bus alignment piece having a molded piece and at least one horizontal conductor. Preferably, there are three horizontal conductors. Each horizontal conductor is structured to extend between, and be in electrical communication with, a socket bus horizontal terminal and a vertical conductor. The molded support includes a non-conductive body having a vertical plate and a horizontal plate. The vertical plate includes an opening for each socket bus horizontal terminal. The openings are structured to position the horizontal terminals in a selected location. The vertical plate is further structured to be coupled to the circuit breaker housing assembly vertical wall and to be disposed within the circuit breaker housing vertical wall opening. The horizontal plate includes a plurality of short vertical walls which form a pocket structured to border each set of horizontal terminals and horizontal conductors. Each horizontal conductor extends generally perpendicular to the associated horizontal terminal and towards a first edge of the horizontal plate. Adjacent to the first edge of the horizontal plate, each pocket includes a horizontal wall having an opening. Each vertical conductor is passed through a horizontal wall opening before being coupled to the horizontal bus. Thus, the combination of the pockets, horizontal buses, and vertical conductors act to secure the molded body in a selected location and thereby eliminate the need for a number of fasteners that were required in the prior art. Additionally, by virtue of the fact that the molded body includes both the circuit breaker support insulator and the bus alignment piece, the total number of components is reduced. Moreover, because the horizontal plate is coupled to the vertical plate, the need for two support brackets is eliminated. However, if desired, one support bracket may be used to couple the horizontal plate to a circuit breaker.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
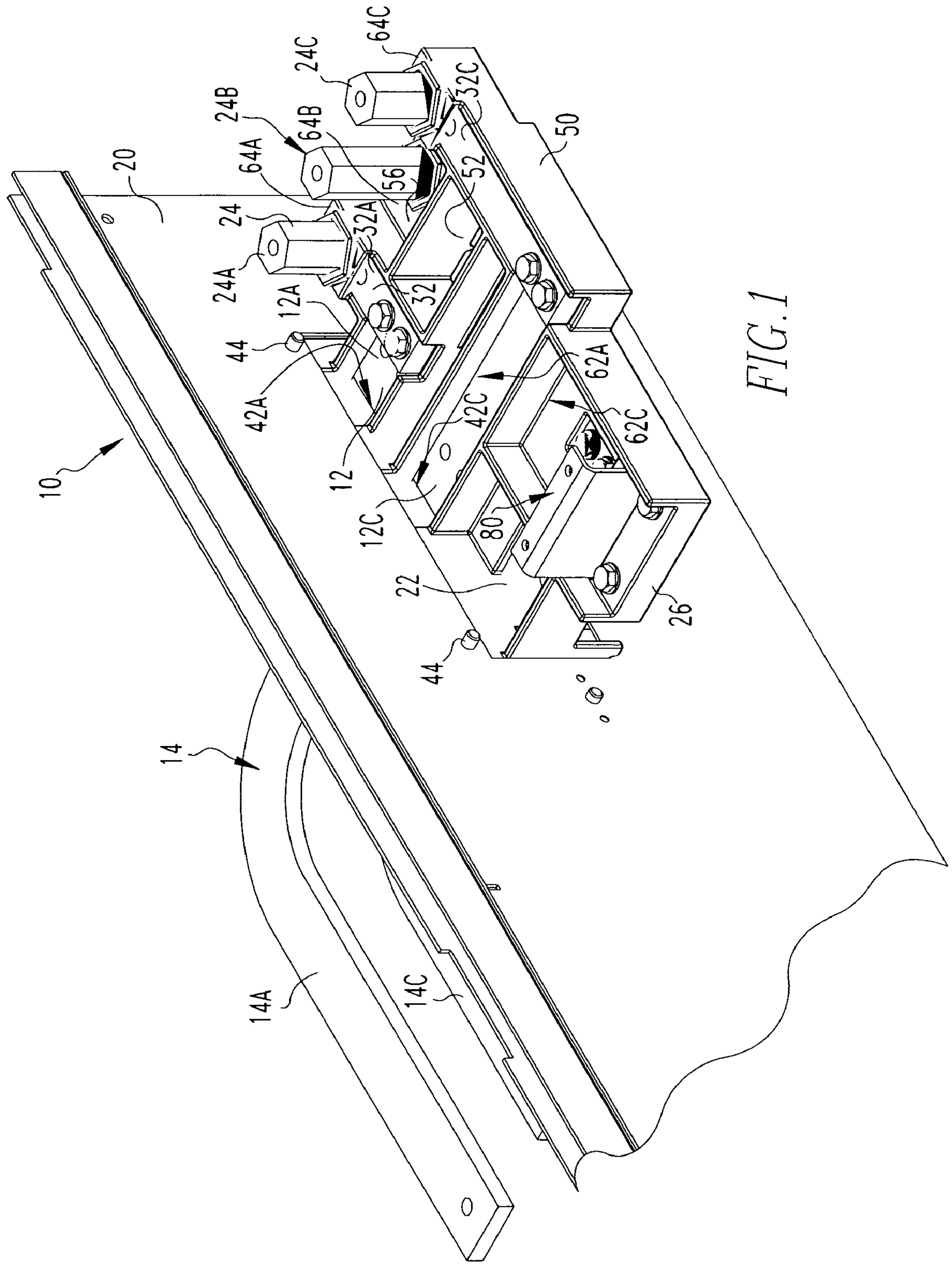
FIG. 1 is a partial isometric top view of a circuit breaker housing assembly.

As shown in FIG. 1, a circuit breaker housing assembly 10 is structured to enclose the horizontal terminal 12 of at least one socket bus 14. As shown, there are preferably three socket buses 14A, 14B, 14C, each having a horizontal terminal 12A, 12B, 12C. The circuit breaker housing assembly 10 includes a vertical sidewall 20 with an opening 22, at least one vertical conductor 24, and a consolidated circuit breaker support insulator and bus alignment piece 26. The socket bus horizontal terminals 12A, 12B, 12C are structured to extend through the circuit breaker housing assembly sidewall opening 22. Preferably, there are three vertical conductors 24A, 24B, 24C. The vertical conductors 24A, 24B, 24C are disposed adjacent to the circuit breaker housing assembly sidewall opening 22. As described below, the consolidated circuit breaker support insulator and bus alignment piece 26 has at least one horizontal bus 32, and preferably three horizontal buses, 32A, 32B, 32C that extend between, and are electrically coupled to, the horizontal terminals 12A, 12B, 12C and the vertical conductors 24A, 24B, 24C.

The consolidated circuit breaker support insulator and bus alignment piece 26 includes a molded body 30 and the horizontal buses 32A, 32B, 32C. The molded body 30 is molded from a non-conductive material such as, but not limited to, DuPont Crastin® HF672FR manufactured by DuPont Engineering Polymers, DuPont Building, 1007 Market Street, Wilmington, Del., 19898. The molded body 30 is a single piece having a vertical plate member 40 and a horizontal plate member 50. The vertical plate member 40 has one alignment opening 42 for each horizontal terminal 12A, 12B, 12C. Preferably, there are three alignment openings 42A, 42B, 42C. The alignment openings 42A, 42B, 42C are structured to allow one horizontal terminal 12A, 12B, 12C to pass therethrough. The alignment openings 42A, 42B, 42C further position the horizontal terminals 12A, 12B, 12C in a selected location so that the horizontal terminals 12A, 12B, 12C may be coupled to the vertical conductors 24A, 24B, 24C. The vertical plate member 40 is further structured to be disposed in the circuit breaker housing assembly sidewall opening 22. The vertical plate member 40 is further structured to be coupled to the circuit breaker housing assembly sidewall 20 by one or more fasteners 44.

Figure 2:
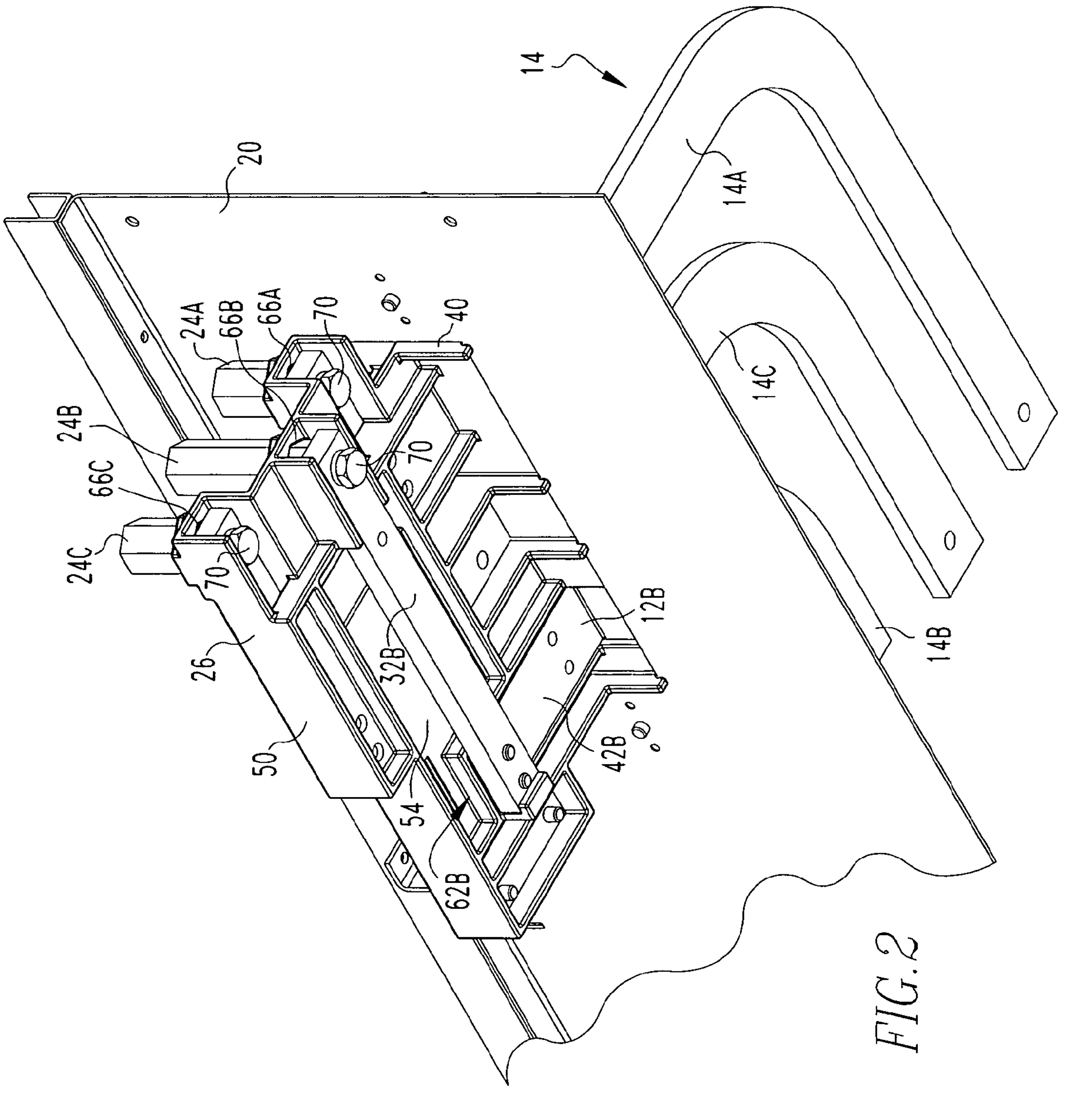
FIG. 2 is a partial isometric bottom view of a circuit breaker housing assembly.

The horizontal plate member 50 is structured to support, and be coupled to, the horizontal buses 32A, 32B, 32C. The horizontal plate member 50 has a top side 52, a bottom side 54, and a first edge 56. As shown in FIG. 2, preferably one horizontal bus 32B and horizontal terminal 12B are disposed below the bottom side 54 and, as shown in FIG. 1, the other two horizontal buses 32A, 32C and horizontal terminals 12A, 12C are disposed above the top side 52. The horizontal plate member 50 includes a plurality of short vertical walls 60 extending from both the top side 52 and bottom side 54. The plurality of vertical walls 60 are structured to form a pocket 62A, 62B, 62C about the horizontal buses 32A, 32B, 32C and the associated horizontal terminals 12A, 12B, 12C. Each pocket 62A, 62B, 62C is not necessarily a complete enclosure. Adjacent to the first edge 56, each pocket 62A. 62B, 62C includes a horizontal wall 64A, 64B, 64C having an opening 66A, 66B, 66C. Each horizontal wall opening 66A, 66B, 66C is structured to allow a vertical conductor 24A, 24B, 24C to pass therethrough.

When assembled, the vertical plate member 40 is disposed in the circuit breaker housing assembly sidewall opening 22 with the horizontal terminals 12A, 12B, 12C passing through an alignment openings 42A, 42B, 42C. The vertical plate member 40 is secured to the circuit breaker assembly sidewall 20 by the fasteners 44. The horizontal terminals 12A, 12B, 12C are each disposed in a pocket 62A, 62B, 62C. The horizontal buses 32A, 32B, 32C are each coupled to a horizontal terminals 12A, 12B, 12C. The horizontal buses 32A, 32B, 32C extend generally perpendicular to the horizontal terminals 12A, 12B, 12C toward the first edge 56. Each horizontal bus 32A, 32B, 32C is also disposed in a pocket 62A, 62B, 62C. Each horizontal bus 32A, 32B, 32C extends below the horizontal wall 64A, 64B, 64C of the pocket 62A, 62B, 62C. The vertical conductors 24A, 24B, 24C are passed through the horizontal wall openings 66A, 66B, 66C and are coupled to a horizontal bus 32A, 32B, 32C by a fastener 70. In this configuration, fasteners 44 on the vertical plate member 40 and the arrangement of horizontal terminals 12A, 12B, 12C and horizontal buses 32A, 32B, 32C disposed in the pockets 62A, 62B, 62C and secured to the vertical conductors 24A, 24B, 24C, act to secure the consolidated circuit breaker support insulator and bus alignment piece 26 in place. The consolidated circuit breaker support insulator and bus alignment piece 26 may also include a circuit breaker support bracket 80, structured to be coupled to a circuit breaker (not shown), if required.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A consolidated circuit breaker support insulator and bus alignment piece structured to be coupled to a circuit breaker housing assembly having a vertical sidewall with an opening, wherein at least one socket bus horizontal terminal extends through said circuit breaker housing assembly sidewall opening, said circuit breaker housing assembly further including at least one vertical conductor disposed adjacent to said circuit breaker housing assembly sidewall opening, said consolidated circuit breaker support insulator and bus alignment piece comprising:

at least one horizontal bus structured to be coupled to said at least one vertical conductor;

a molded, single piece, nonconductive body having vertical plate member and a horizontal plate member;

said vertical plate member having at least one alignment opening structured to allow said at least one socket bus horizontal terminal to pass therethrough, said vertical plate member further structured to be coupled to said circuit breaker housing assembly and to be disposed in said circuit breaker housing assembly sidewall opening;

said horizontal plate member structured to support said at least one horizontal bus; and said at least one horizontal bus coupled to said horizontal plate member.

2. The consolidated circuit breaker support insulator and bus alignment piece of claim 1 wherein said horizontal plate member includes a plurality of vertical walls, said vertical walls structured to form a pocket about said at least one horizontal bus and said at least one horizontal terminal.

3. The consolidated circuit breaker support insulator and bus alignment piece of claim 2 wherein said pocket includes a horizontal wall having an opening, said opening structured to allow said vertical conductor to pass therethrough.

4. The consolidated circuit breaker support insulator and bus alignment piece of claim 1 wherein said at least one socket bus horizontal terminal includes three horizontal terminals, and wherein said at least one horizontal bus includes three horizontal buses; and each said horizontal bus is structured to be coupled to, and extend generally perpendicular from, each said horizontal terminal.

5. The consolidated circuit breaker support insulator and bus alignment piece of claim 4 wherein said horizontal plate member includes a plurality of vertical walls, said vertical walls structured to form a pocket about each said horizontal bus and each said horizontal terminal.

6. The consolidated circuit breaker support insulator and bus alignment piece of claim 5 wherein each said pocket includes a horizontal wall having an opening, said opening structured to allow said vertical conductor to pass therethrough.

7. The consolidated circuit breaker support insulator and bus alignment piece of claim 6 wherein:

said horizontal plate member is generally rectangular having a top side, a bottom side, and a first edge;

each said horizontal bus extends perpendicular from said horizontal terminal toward said first edge; and each said pocket horizontal wall is disposed adjacent to said first edge.

8. The consolidated circuit breaker support insulator and bus alignment piece of claim 7 wherein:

two of said horizontal terminals are disposed above said horizontal plate member top side; and one of said horizontal terminals is disposed below said horizontal plate member bottom side.

9. The consolidated circuit breaker support insulator and bus alignment piece of claim 1 wherein said vertical plate member and said horizontal plate member form a generally T-shaped body.

10. The consolidated circuit breaker support insulator and bus alignment piece of claim 1 further including a circuit breaker bracket structured to be coupled to a circuit breaker.

11. A circuit breaker housing assembly structured to enclose the horizontal end of at least one socket bus, said circuit breaker housing assembly comprising:

a vertical sidewall with an opening, wherein at least one socket bus horizontal terminal is structured to extend through said circuit breaker housing assembly sidewall opening;

at least one vertical conductor disposed adjacent to said circuit breaker housing assembly sidewall opening, a consolidated circuit breaker support insulator and bus alignment piece having at least one horizontal bus structured to be coupled to said at least one vertical conductor and a molded, single piece, nonconductive body having vertical plate member and a horizontal plate member;

said vertical plate member having at least one alignment opening structured to allow said at least one socket bus horizontal terminal to pass therethrough, said vertical plate member further structured to be coupled to said circuit breaker housing assembly and to be disposed in said circuit breaker housing assembly sidewall opening;

said horizontal plate member structured to support said at least one horizontal bus; and said at least one horizontal bus coupled to said horizontal plate member.

12. The circuit breaker housing assembly of claim 11 wherein said horizontal plate member includes a plurality of vertical walls, said vertical walls structured to form a pocket about said at least one horizontal bus and said at least one horizontal terminal.

13. The circuit breaker housing assembly of claim 12 wherein said pocket includes a horizontal wall having an opening, said opening structured to allow said vertical conductor to pass therethrough.

14. The circuit breaker housing assembly of claim 11 wherein said at least one socket bus horizontal terminal includes three horizontal terminals, and wherein said at least one horizontal bus includes three horizontal buses; and each said horizontal bus is structured to be coupled to, and extend generally perpendicular from, each said horizontal terminal.

15. The circuit breaker housing assembly of claim 14 wherein said horizontal plate member includes a plurality of vertical walls, said vertical walls structured to form a pocket about each said horizontal bus and each said horizontal terminal.

16. The circuit breaker housing assembly of claim 15 wherein each said pocket includes a horizontal wall having an opening, said opening structured to allow said vertical conductor to pass therethrough.

17. The circuit breaker housing assembly of claim 16 wherein:

said horizontal plate member is generally rectangular having a top side, a bottom side, and a first edge;

each said horizontal bus extends perpendicular from said horizontal terminal toward said first edge; and each said pocket horizontal wall is disposed adjacent to said first edge.

18. The circuit breaker housing assembly of claim 17 wherein:

two of said horizontal terminals are disposed above said horizontal plate member top side; and one of said horizontal terminals is disposed below said horizontal plate member bottom side.

19. The circuit breaker housing assembly of claim 11 wherein said vertical plate member and said horizontal plate member form a generally T-shaped body.

20. The circuit breaker housing assembly of claim 11 further including a circuit breaker bracket structured to be coupled to a circuit breaker.

* * * * *